(12) United States Patent
Didey et al.

(10) Patent No.: US 10,919,620 B2
(45) Date of Patent: Feb. 16, 2021

(54) LANDING GEAR BOGIE PITCH TRIMMER

(71) Applicant: Airbus Operations Limited, Bristol (GB)

(72) Inventors: Arnaud Didey, Bristol (GB); James Barnes, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 262 days.

(21) Appl. No.: 15/987,451

(22) Filed: May 23, 2018

(65) Prior Publication Data

US 2018/0339766 A1 Nov. 29, 2018

(30) Foreign Application Priority Data

May 25, 2017 (GB) ...................................... 1708409

(51) Int. Cl.
*B64C 25/22* (2006.01)
*B64C 25/34* (2006.01)
*F15B 13/04* (2006.01)
*F15B 1/08* (2006.01)

(52) U.S. Cl.
CPC .............. *B64C 25/22* (2013.01); *B64C 25/34* (2013.01); *F15B 1/08* (2013.01); *F15B 13/0401* (2013.01); *B64C 2025/345* (2013.01); *F15B 2201/50* (2013.01)

(58) Field of Classification Search
CPC ... B64C 25/22; B64C 25/34; B64C 2025/345; F15B 21/045; F15B 15/16; F15B 1/08; F15B 13/0401; F15B 2201/50
USPC .............................................. 137/91, 92, 60
See application file for complete search history.

(56) References Cited

U.S. PATENT DOCUMENTS

| 2010/0288878 | A1* | 11/2010 | Bennett | B64C 25/34 244/104 FP |
|---|---|---|---|---|
| 2013/0119196 | A1* | 5/2013 | Lindahl | F15B 15/16 244/100 R |
| 2013/0233968 | A1* | 9/2013 | Goodburn | B64C 25/22 244/102 A |
| 2015/0375856 | A1* | 12/2015 | Hodgkinson | B64C 25/34 244/104 R |
| 2018/0222599 | A1* | 8/2018 | Papadopoulos | F15B 19/005 |

FOREIGN PATENT DOCUMENTS

| GB | 932731 | 7/1963 |
|---|---|---|
| GB | 2470500 | 11/2010 |
| GB | 2483472 | 3/2012 |

OTHER PUBLICATIONS

Combined Search and Examination Report GB1708409.6, dated Nov. 13, 2017, 7 pages.

* cited by examiner

*Primary Examiner* — Philip J Bonzell
*Assistant Examiner* — Tye William Abell
(74) *Attorney, Agent, or Firm* — Nixon & Vanderhye P.C.

(57) ABSTRACT

Disclosed is a landing gear bogie pitch trimmer, comprising a hydraulic actuator for adjusting a pitch of a landing gear bogie, in use, a fluid interface for receiving, from an aircraft hydraulic system external to the landing gear bogie pitch trimmer, hydraulic fluid for use in actuating the hydraulic actuator, and a flow control valve for controlling flow of the hydraulic fluid through the fluid interface in use. Also disclosed is a system, a landing gear controller, a method, and an aircraft.

15 Claims, 4 Drawing Sheets

LANDING GEAR BOGIE PITCH TRIMMER

CROSS RELATED APPLICATION

This application relates to and claims priority to United Kingdom application number GB 1708409.6 filed May 25, 2017, the entirety of which is incorporated by reference.

TECHNICAL FIELD

The present invention relates to a landing gear bogie pitch trimmer, to a system comprising the landing gear bogie pitch trimmer and a hydraulic landing gear extension and retraction system, to a landing gear controller, to a method, and to an aircraft.

BACKGROUND

Some aircraft comprise one or more landing gears comprising a bogie that carries at least two wheels. An increased number of wheels can help to limit the loading of each tyre in use. Typically, such landing gears comprise a bogie pitch trimmer comprising an actuator. The actuator is actuated in use to position the bogie to an appropriate pitch or angle, such as for a landing procedure.

SUMMARY

A first aspect of the present invention provides a landing gear bogie pitch trimmer comprising: a hydraulic actuator for adjusting a pitch of a landing gear bogie, in use; a fluid interface for receiving, from an aircraft hydraulic system external to the landing gear bogie pitch trimmer, hydraulic fluid for use in actuating the hydraulic actuator; and a flow control valve for controlling flow of the hydraulic fluid through the fluid interface in use.

Optionally, the landing gear bogie pitch trimmer comprises a gas-chargeable accumulator in fluid communication with the flow control valve, and the gas-chargeable accumulator is configured to deliver the hydraulic fluid to the hydraulic actuator in use.

Optionally, the landing gear bogie pitch trimmer comprises a terminal that is connected to the gas-chargeable accumulator and that is for connection to a monitor for monitoring a characteristic of the gas-chargeable accumulator.

Optionally, the landing gear bogie pitch trimmer comprises a non-return valve for restricting or preventing flow of hydraulic fluid in a direction from the gas-chargeable accumulator towards the fluid interface.

Optionally, the landing gear bogie pitch trimmer is configured so that, in a first position of the flow control valve, a first side of the hydraulic actuator is in fluid communication with the fluid interface via the flow control valve, so that the hydraulic actuator is actuated to move the landing gear bogie by the flow of hydraulic fluid in use.

Optionally, the landing gear bogie pitch trimmer is configured so that, in a second position of the flow control valve, the first side of the hydraulic actuator is in fluid communication with a second side of the hydraulic actuator.

Optionally, operation of the flow control valve is controlled by a pressure of hydraulic fluid between the fluid interface and the flow control valve.

Optionally, the landing gear bogie pitch trimmer comprises a second fluid interface, wherein the hydraulic actuator is selectively fluidly connectable to the second fluid interface to permit the flow of hydraulic fluid from the hydraulic actuator out of the landing gear bogie pitch trimmer via the second fluid interface.

Optionally, the landing gear bogie pitch trimmer comprises a second non-return valve for restricting or preventing flow of hydraulic fluid from the second fluid interface towards the hydraulic actuator. Optionally, the second fluid interface is the fluid interface.

A second aspect of the present invention provides a system, comprising: a landing gear bogie pitch trimmer, and a hydraulic landing gear extension and retraction system for extending and retracting a landing gear upon which a landing gear bogie is mounted. The hydraulic landing gear extension and retraction system comprises a hydraulic fluid supply line. The landing gear bogie pitch trimmer comprises: a hydraulic actuator for adjusting a pitch of the landing gear bogie, in use; a fluid interface for connection to the hydraulic fluid supply line of the hydraulic landing gear extension and retraction system for receiving hydraulic fluid for use in actuating the hydraulic actuator; and a flow control valve for controlling flow of the hydraulic fluid through the fluid interface in use.

Optionally, the landing gear bogie pitch trimmer has any one or more of the features discussed above as optional in the landing gear bogie pitch trimmer of the first aspect of the present invention.

Optionally, the hydraulic fluid supply line of the hydraulic landing gear extension and retraction system is fluidly connected to the fluid interface of the landing gear bogie pitch trimmer. Alternatively, the system of the second aspect of the present invention may be in the form of a kit comprising the landing gear bogie pitch trimmer and the hydraulic landing gear extension and retraction system.

Optionally, the system is configured so that operation of the hydraulic landing gear extension and retraction system causes operation of the flow control valve of the landing gear bogie pitch trimmer in use.

Optionally, the system is configured so that hydraulic fluid is unable to flow to the landing gear bogie pitch trimmer from the hydraulic landing gear extension and retraction system when the landing gear is in the fully retracted position and/or the fully extended position of the landing gear.

A third aspect of the present invention provides a landing gear controller to control a flow control valve of a landing gear bogie pitch trimmer, the flow control valve for controlling flow of a hydraulic fluid through a fluid interface of the landing gear bogie pitch trimmer from an aircraft hydraulic system external to the landing gear bogie pitch trimmer. The landing gear controller is configured to: determine, based on at least one predetermined criterion, whether a flow of hydraulic fluid through the fluid interface is to be permitted by the flow control valve; and, when it is determined that the flow of hydraulic fluid through the fluid interface is to be permitted, to cause the flow control valve to be in an open position to permit flow of hydraulic fluid through the fluid interface.

Optionally, the landing gear controller is configured to receive a signal indicative of a characteristic of the landing gear bogie pitch trimmer, and the at least one predetermined criterion is based on the characteristic of the landing gear bogie pitch trimmer.

Optionally, the characteristic is a characteristic of a gas-chargeable accumulator of the landing gear bogie pitch trimmer.

Optionally, the landing gear controller is configured to determine, based on the signal and a compensation for a determined temperature in the gas-chargeable accumulator and/or a determined pressure in the gas-chargeable accumulator, whether the at least one predetermined criterion has been met.

Optionally, the landing gear controller is configured to cause the flow control valve to open immediately before and/or after extension and/or retraction of a landing gear upon which the landing gear bogie pitch trimmer acts.

Optionally, the landing gear controller is configured to cause the flow control valve to open during extension and/or retraction of a landing gear upon which the landing gear bogie pitch trimmer acts.

A fourth aspect of the present invention provides a method, comprising: providing a bogie pitch trimmer according to the first aspect of the present invention, and selectively operating the flow control valve to control the flow of the hydraulic fluid through the fluid interface.

Optionally, the aircraft hydraulic system external to the landing gear bogie pitch trimmer is a hydraulic landing gear extension and retraction system for extending and retracting a landing gear upon which the landing gear bogie is mounted.

Optionally, the method comprises receiving a signal indicating that the hydraulic fluid is to be supplied from the aircraft hydraulic system to the landing gear bogie pitch trimmer, wherein the selectively operating the flow control valve is in dependence on the signal.

Optionally, the signal is indicative of a characteristic of a gas-chargeable accumulator of the landing gear bogie pitch trimmer.

Optionally, the method comprises performing an extension or retraction of the landing gear, and the selectively operating the flow control valve is in dependence on the extension or retraction of the landing gear.

A fifth aspect of the present invention provides a non-transitory computer-readable storage medium storing instructions that, if executed by a processor of a landing gear controller, cause the processor to carry out the method according to the fourth aspect of the present invention.

A sixth aspect of the present invention provides a landing gear bogie pitch trimmer, comprising: a pitch adjuster for adjusting a pitch of a landing gear bogie, in use; an inlet for receiving, from a system external to the landing gear bogie pitch trimmer, fluid for use in operating the pitch adjuster; and a fluid passage controller for controlling passage of the fluid through the inlet in use. Optionally, the fluid is hydraulic fluid.

A seventh aspect of the present invention provides an aircraft, comprising one or more of: the landing gear bogie pitch trimmer according to the first aspect or the sixth aspect of the present invention, the system according to the second aspect of the present invention, the landing gear controller according to the third aspect of the present invention, and the non-transitory computer-readable storage medium according to the fifth aspect of the present invention.

BRIEF DESCRIPTION OF THE DRAWINGS

Embodiments of the invention will now be described, by way of example only, with reference to the accompanying drawings, in which.

DETAILED DESCRIPTION

The following description relates, amongst other things, to landing gear bogie pitch trimmers and to controllers and methods for controlling the flow of fluid to a landing gear bogie pitch trimmer from an aircraft hydraulic system external to the landing gear bogie pitch trimmer.

In some systems, known as dependent systems, a landing gear bogie pitch trimmer receives a supply of hydraulic fluid from a centralised aircraft hydraulic system, and is continuously energised by the aircraft hydraulic system. That is, the bogie pitch trimmer is energised when the aircraft hydraulic system is energised, for example, on the ground, during taxi, during extension and retraction of a landing gear upon which the bogie pitch trimmer acts, and in flight. When energised in-flight, the bogie pitch trimmer actuator helps to actively maintain the landing gear in a stowed position.

In other systems, known as independent systems, a landing gear bogie pitch trimmer comprises an independent, self-contained system. The system is continuously energised by a self-contained, pressurised reservoir or accumulator. The reservoir or accumulator may be pressurised by, for example, a Nitrogen cylinder which is topped-up at regular service intervals. A sufficient pressure is required to ensure sufficient force is supplied to an actuator of the landing gear bogie pitch trimmer to position the landing gear bogie upon which the bogie pitch trimmer acts at a predetermined pitch. The pressure in the independent system must be sufficient to prevent cavitation in the system. Independent systems can be used in aircraft which do not comprise a centralised aircraft hydraulic system. An independent bogie pitch trimmer may be a hydraulic system.

Figure 1:
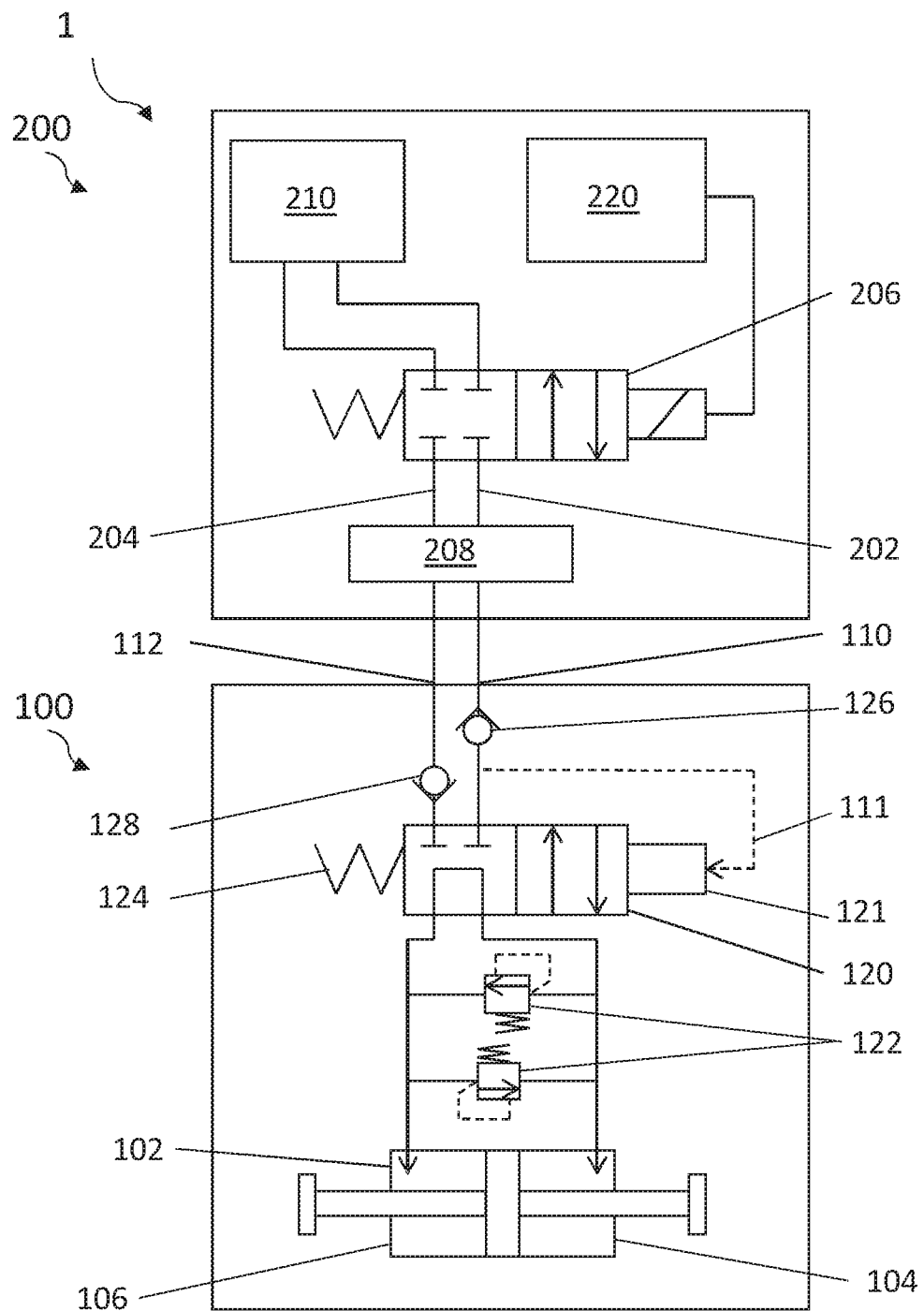
FIG. 1 shows a schematic view of an example of a system according to an embodiment of the present invention.

FIG. 1 shows a schematic diagram of a system 1 according to an embodiment of the invention. The system 1 comprises a landing gear bogie pitch trimmer 100 and a hydraulic landing gear extension and retraction system 200 for extending and retracting a landing gear upon which a landing gear bogie is mounted. The hydraulic landing gear extension and retraction system 200 is external to the landing gear bogie pitch trimmer 100.

The hydraulic landing gear extension and retraction system 200 comprises a hydraulic fluid supply line 202. The landing gear bogie pitch trimmer 100 comprises a pitch adjuster, in the form of a hydraulic actuator 102 in this embodiment, for adjusting a pitch of the landing gear bogie, in use, and an inlet or fluid interface 110 for connection to the hydraulic fluid supply line 202 of the hydraulic landing gear extension and retraction system 200. The fluid interface 110 is for receiving hydraulic fluid from the hydraulic landing gear extension and retraction system 200, for use in actuating the hydraulic actuator 102. The landing gear bogie pitch trimmer 100 further comprises a fluid passage controller 120 for controlling passage of the fluid through the inlet 110 in use. The fluid passage controller is in the form of a flow control valve 120 for controlling flow of the hydraulic fluid through the fluid interface 110 in use.

In use, the hydraulic fluid supply line 202 is fluidly connected to the fluid interface 110. The flow control valve 120 is configured to control the flow of hydraulic fluid through the fluid interface 110 from the hydraulic fluid supply line 202. The landing gear extension and retraction system 200 may comprise a reservoir 210 for containing a volume of hydraulic fluid. The landing gear extension and retraction system 200 may be configured to supply hydraulic fluid to the hydraulic fluid supply line 202 from the reservoir 210. Hydraulic fluid may alternatively be supplied to the landing gear bogie pitch trimmer 100 from a hydraulic manifold of the hydraulic landing gear extension and retraction system 200.

The hydraulic landing gear extension and retraction system 200 may be, or be part of, a centralised aircraft hydraulic system. Alternatively, the hydraulic landing gear extension and retraction system 200 may be a local landing gear hydraulic system, for example on an aircraft that does not comprise a centralised aircraft hydraulic system. In the embodiments shown in the appended drawings, the landing gear extension and retraction system 200 is a local landing gear hydraulic system configured to be intermittently energised for extending or retracting a landing gear, to energise the landing gear bogie pitch trimmer 100, and to be dormant at other times. Such a configuration reduces the duty cycle of the local landing gear hydraulic system 200, which helps to reduce the overall size and weight of the local landing gear hydraulic system. It is to be understood that other embodiments may employ a different aircraft hydraulic system to those shown in the drawings.

In this embodiment, the landing gear bogie pitch trimmer 100 is configured so that, in a first position (not shown) of the flow control valve 120, a first side 104 of the hydraulic actuator 102 is in fluid communication with the fluid interface 110 via the flow control valve 120, so that the hydraulic actuator 102 is actuated to move the landing gear bogie upon which the landing gear bogie pitch trimmer 100 acts. That is, the supply of hydraulic fluid to the hydraulic actuator 102 from the fluid interface 110 causes actuation of the hydraulic actuator 102 to change the pitch of the landing gear bogie.

The landing gear bogie pitch trimmer 100 of this embodiment is also configured so that, in a second position of the flow control valve 120 (as shown in FIG. 1), the first side 104 of the hydraulic actuator 102 is in fluid communication with a second side 106 of the hydraulic actuator 102. This fluid communication in this embodiment is via the flow control valve 120, as best understood from consideration of FIG. 1. Such a configuration can help enable the hydraulic actuator 102 to act as a landing gear bogie damping mechanism when the landing gear is extended in use. The hydraulic actuator 102 may be an equal area actuator to provide equal damping force for each direction of actuation of the hydraulic actuator 102. The landing gear bogie pitch trimmer 100 may comprise a restrictor (not shown) to help provide an increased damping force. In some embodiments, the flow control valve 120 may be configured to be positionable in one or more other positions, such as one or more intermediate positions between the first and second positions.

Although not required in each embodiment, in this embodiment the landing gear bogie pitch trimmer comprises two pressure relief valves 122 configured to open when subjected to a fluid of at least a predetermined pressure. In this embodiment, a first of the pressure relief valves 122 is arranged to open to fluidly connect the two sides 104, 106 of the hydraulic actuator 102 on the basis of a fluid pressure on the first side 104 of the hydraulic actuator 102, and a second of the pressure relief valves 122 is arranged to open to fluidly connect the two sides 104, 106 of the hydraulic actuator 102 on the basis of a fluid pressure on the second side 106 of the hydraulic actuator 102. The one or more pressure relief valves 122 may help to prevent rupture of hydraulic pipes of the landing gear bogie pitch trimmer 100 or the hydraulic landing gear extension and retraction system 200 in use, such as when the bogie is subjected to ground-induced loading. To help reduce environmental contamination, the one or more pressure relief valves 122 may vent to an unpressurised side of the hydraulic actuator 102.

In this embodiment, the landing gear bogie pitch trimmer 100 comprises a non-return valve 126 for restricting or preventing flow of hydraulic fluid in a direction from the hydraulic actuator 102 towards the fluid interface 110, when the flow control valve 120 is in its first position. The non-return valve 126 can help to maintain hydraulic pressure on the hydraulic actuator 102 side of the flow control valve 120.

In some embodiments, the flow control valve 120 is configured to be biased to the second position. The second position is a position in which the flow control valve 120 prevents or restricts the flow of hydraulic fluid from the fluid interface 110 towards the hydraulic actuator 102. The second position may be defined as a closed position of the flow control valve 120. By way of example only, in this embodiment the flow control valve 120 is biased to the second position by a spring 124. In this embodiment, operation of the flow control valve 120 is controlled by the pressure of hydraulic fluid between the fluid interface 110 and the flow control valve 120. In the embodiment of FIG. 1, the flow control valve 120 is a shuttle valve.

The hydraulic landing gear extension and retraction system 200 of this embodiment comprises an isolation valve 206 for isolating the landing gear bogie pitch trimmer 100 and the hydraulic fluid supply line 202 from the rest of the hydraulic landing gear extension and retraction system 200. In the embodiment of FIG. 1, the isolation valve 206 is a shuttle valve, which is biased to an isolation position in which hydraulic fluid is not permitted to flow into the hydraulic fluid supply line 202 from the rest of the hydraulic landing gear extension and retraction system 200. The system 1 is configured such that, when the isolation valve 206 is in an open position, hydraulic fluid can flow from the hydraulic landing gear extension and retraction system 200 through the fluid interface 110 to the input 121 of the flow control valve 120 (as shown in FIG. 1 by dashed line 111). The flow control valve 120 is configured so that hydraulic fluid pressure at the input 121 of the flow control valve 120 causes the flow control valve 120 to move to the first position so that the first side 104 of the hydraulic actuator 102 is placed into fluid communication with the fluid interface 110.

The system 1 of this embodiment is configured so that, in use, operation of the hydraulic landing gear extension and retraction system 200 to extend or retract the landing gear upon which the landing gear bogie pitch trimmer 100 acts causes operation of the flow control valve 120 of the landing gear bogie pitch trimmer 100. More specifically, the system 1 is configured so that the flow control valve 120 is moved to the first position from the second position when the hydraulic landing gear extension and retraction system 200 operates to extend and/or retract the landing gear. That is, the system 1 is configured so that the hydraulic actuator 102 (a) receives hydraulic fluid from the fluid interface 110 when the hydraulic landing gear extension and retraction system 200 extends and/or retracts the landing, and (b) is configured to actuate upon receipt of the hydraulic fluid to change the pitch of the landing gear bogie during the extension and/or retraction of the landing gear. The system 1 is configured so that the flow control valve 120 is permitted to return under the bias of the spring 124 to the second position upon completion of the extension or retraction of the landing gear.

The system 1 of this embodiment is further configured so that, in use, the flow control valve 120 is configured to be in the second position when the landing gear is in the extended or stowed position. That is, the hydraulic actuator 102 does not receive hydraulic fluid from the fluid interface 110 when the landing gear is in the extended or stowed position. The landing gear may be arranged so that the landing gear bogie is biased to a predetermined pitch when the landing gear is in the extended position, for example by aero-loading. The landing gear may be held in a stowed position in a landing gear bay by, for example, guides or one or more locking mechanisms.

In some embodiments, as shown by way of example in the embodiment of FIG. 1, the landing gear bogie pitch trimmer 100 comprises a second fluid interface 112. The hydraulic actuator 102 is selectively fluidly connectable to the second fluid interface 112 to permit the flow of hydraulic fluid from the hydraulic actuator 102 out of the landing gear bogie pitch trimmer 100 via the second fluid interface 112. In this embodiment, the second side 106 of the hydraulic actuator 102 is in fluid communication with the second fluid interface 112 via the flow control valve 120 when the flow control valve 120 is in the first position (not shown). The second fluid interface 112 is connectable to a hydraulic return line 204 of the hydraulic landing gear extension and retraction system 200 to return hydraulic fluid to the reservoir 210 when the flow control valve 120 is in the first position.

The landing gear bogie pitch trimmer 100 also comprises a second non-return valve 128 for restricting or preventing flow of hydraulic fluid from the second fluid interface 112 towards the hydraulic actuator 102, when the flow control valve 120 is in its second position. In this embodiment, the second non-return valve 128 is located between the second fluid interface 112 and the flow control valve 120. In other embodiments, the second non-return valve 128 may be located between the flow control valve 120 and the hydraulic actuator 102.

In this embodiment, the hydraulic landing gear extension and retraction system 200 comprises a hydraulic fuse 208 to help protect the system 1 in the event of a pipe rupture. The hydraulic fuse 208 is configured to be triggered in the event of abnormally high flow rate of hydraulic fluid through the hydraulic fluid supply line 202, such as due to rupture of the hydraulic fluid supply line 202 by bird strike or the like. In such circumstances, the hydraulic fuse 208 acts to prevent or restrict the supply of fluid from the hydraulic landing gear extension and retraction system 200 along the hydraulic fluid supply line 202, to reduce or avoid excessive loss of hydraulic fluid from the system 1.

In some embodiments, such as that shown in FIG. 1, the system 1 comprises a landing gear controller 220. In the present embodiment, the hydraulic landing gear extension and retraction system 200 comprises the landing gear controller 220. In other embodiments, the landing gear controller 220 may be external to the hydraulic landing gear extension and retraction system 200.

The landing gear controller 220 is, ultimately, to control the flow control valve 120 of the landing gear bogie pitch trimmer 100. More specifically, the landing gear controller 220 is configured to determine, based on at least one predetermined criterion, whether a flow of hydraulic fluid through the fluid interface 110 is to be permitted by the flow control valve 120, and, when it is determined that the flow of hydraulic fluid through the fluid interface 110 is to be permitted, to cause the flow control valve 120 to open to permit flow of hydraulic fluid through the fluid interface 110. In this embodiment, "open" is a position of the flow control valve 120 in which hydraulic fluid is able to flow from the fluid interface 110 to the hydraulic actuator 102 to actuate the hydraulic actuator 102.

In some embodiments, the at least one predetermined criterion may be that the hydraulic landing gear extension and retraction system 200 is energised. Additionally, or alternatively, the at least one predetermined criterion may be that the landing gear is to be extended or retracted, or that extension or retraction of the landing gear has been completed. The landing gear controller 220 may be configured to cause the flow control valve 120 to open during extension and/or retraction of the landing gear upon which the landing gear bogie pitch trimmer 100 acts in use.

The landing gear controller 220 may be configured to cause closure of the flow control valve 120 after expiry of a predetermined interval of time. In some embodiments, the predetermined interval of time may be a duration of time during which the landing gear is extended or retracted by the hydraulic landing gear extension and retraction system 200. In other embodiments, the predetermined interval of time may be the duration of time taken by the hydraulic actuator 102 to position the landing gear bogie in a predetermined position. The predetermined interval of time may be dependent on the hydraulic pressure of the hydraulic landing gear extension and retraction system 200. The predetermined interval of time may equate to an amount of time required to deliver a known volume of hydraulic fluid to the fluid interface 110, for example a volume of hydraulic fluid to fully actuate the hydraulic actuator 102.

Figure 2:
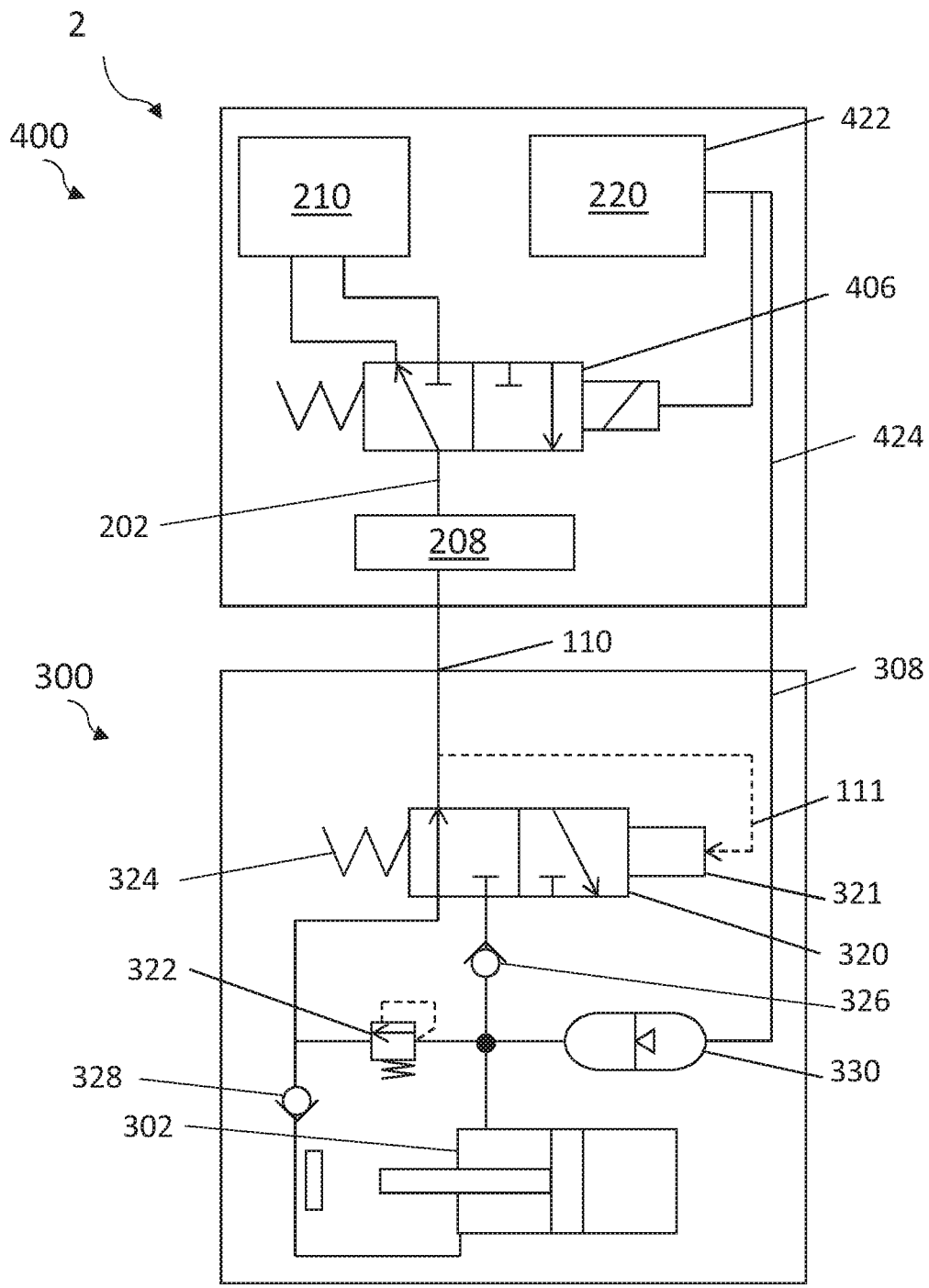
FIG. 2 shows a schematic view of an example of another system according to an embodiment of the present invention.

FIG. 2 shows a schematic diagram of a system 2 according to another embodiment of the present invention. The system 2 comprises a landing gear bogie pitch trimmer 300 and a hydraulic landing gear extension and retraction system 400 for extending and retracting a landing gear upon which a landing gear bogie is mounted. The hydraulic landing gear extension and retraction system 400 is external to the landing gear bogie pitch trimmer 300.

The hydraulic landing gear extension and retraction system 400 and the landing gear bogie pitch trimmer 300 have some features common to those described with reference to FIG. 1. Features that are common to the two embodiments are indicated with common reference numerals in FIGS. 1 and 2 and will not be described again now in the interests of conciseness.

In this embodiment, the landing gear bogie pitch trimmer 300 comprises a gas-chargeable accumulator 330 in fluid communication with the flow control valve 320. The gas-chargeable accumulator 330 is configured to cause hydraulic fluid, which has been received via the fluid interface 110, to be delivered to the hydraulic actuator 302 in use. In other embodiments, the landing gear bogie pitch trimmer 300 may comprise a hydraulic fluid reservoir instead of the gas-charged accumulator 330.

The gas-chargeable accumulator 330 may be chargeable by gas bottles containing, for example, Nitrogen or Helium. Other gases may be used to charge the gas-chargeable accumulator 330. In use, the pressure of the gas-chargeable accumulator 330 may be affected by the operating environment of the landing gear bogie pitch trimmer 300. For example, lower temperatures generally experienced when an aircraft is at a relatively high altitude can reduce the pressure of the gas-chargeable accumulator 330. Generally, the pressure of the gas-chargeable accumulator 330 is lower when the aircraft is in flight compared to during a service operation conducted when the aircraft is on the ground.

In use, the pressure of gas in one side of the accumulator 330 exerts a force on the hydraulic fluid in the other side of the accumulator 330. In use, the hydraulic fluid supply line 202 is fluidly connected to the fluid interface 110, and the system 2 is configured to supply hydraulic fluid to the gas-chargeable accumulator 330 via the hydraulic fluid supply line 202 to increase the volume of hydraulic fluid in the accumulator 330 to thereby reduce the volume of gas and, in turn increase the gas pressure of the gas-chargeable accumulator 330. In turn, this can help to increase the force that the hydraulic actuator 302 can exert when actuated.

The landing gear bogie pitch trimmer 300 is configured so that, in a first position of the flow control valve 320 (not shown), the gas-chargeable accumulator 330 is in fluid communication with the fluid interface 110 via the flow control valve 320, so that the volume of hydraulic fluid in the gas-chargeable accumulator 330 may be increased from the hydraulic landing gear extension and retraction system 400.

In this embodiment, the landing gear bogie pitch trimmer 300 comprises a non-return valve 326 for restricting or preventing flow of hydraulic fluid in a direction from the gas-chargeable accumulator 330 towards the fluid interface 110, when the flow control valve 120 is in its first position. The non-return valve 326 is located between the actuator 102 and the flow control valve 120. The non-return valve 326 can help to maintain hydraulic pressure on the hydraulic actuator 302 side of the flow control valve 320.

The landing gear bogie pitch trimmer 300 is configured so that, in a second position of the flow control valve 320 (as shown in FIG. 2), hydraulic fluid is prevented from flowing from the fluid interface 110 to the gas-chargeable accumulator 330. In the second position of the flow control valve 320, the hydraulic actuator 302 is fluidly connected to the fluid interface 110 to permit the flow of hydraulic fluid from the hydraulic actuator 302 out of the landing gear bogie pitch trimmer 300 via the fluid interface 110. The fluid interface 110 is in fluid communication with a reservoir 210 of the hydraulic landing gear extension and retraction system 400, for the return of hydraulic fluid from the hydraulic actuator 302 to the hydraulic landing gear extension and retraction system 400. Such a configuration can help to reduce the overall leakage of hydraulic fluid by the system 2.

In this embodiment, the landing gear bogie pitch trimmer 300 comprises a second non-return valve 328 for restricting or preventing flow of hydraulic fluid from the fluid interface 110 towards the hydraulic actuator 302 when the flow control valve 320 is in its second position.

In this embodiment, the hydraulic fluid supply line 202 is a single, two-way supply line, configured to permit flow of hydraulic fluid to the landing gear bogie pitch trimmer 300 when the flow control valve 320 is in the first position and to permit flow of hydraulic fluid to the hydraulic landing gear extension and retraction system 400 when the flow control valve 320 is in the second position. In alternative embodiments, the landing gear bogie pitch trimmer 300 may have a second fluid interface that is distinct from the fluid interface 110 and fluidly connectable or connected to a reservoir 210 of the hydraulic landing gear extension and retraction system 400 for this return of hydraulic fluid.

The landing gear bogie pitch trimmer 300 comprises a pressure relief valve 322 configured to open when subjected to a fluid of at least a predetermined pressure. More specifically, the pressure relief valve 322 is arranged to open to fluidly connect the accumulator 330 and the hydraulic actuator 302 with the fluid interface 110, when the flow control valve 320 is in the second position. The pressure relief valve 322 may help to prevent rupture of hydraulic pipes of the landing gear bogie pitch trimmer 300 or the hydraulic landing gear extension and retraction system 400.

In some embodiments, such as that shown in FIG. 2, the flow control valve 320 is configured to be biased to the second position. The second position is the position in which the flow control valve 320 prevents or restricts the flow of hydraulic fluid from the fluid interface 110 to the gas-chargeable accumulator 330. By way of example only, in this embodiment the flow control valve 320 is biased to the second position by a spring 324.

The system 2 is configured so that operation of the hydraulic landing gear extension and retraction system 400 causes operation of the flow control valve 320 of the landing gear bogie pitch trimmer 300. Operation of the flow control valve 320 is controlled by the pressure of hydraulic fluid between the fluid interface 110 and the flow control valve 320. That is, the flow control valve 320 is configured so that an increase in pressure of hydraulic fluid from the fluid interface 110 causes the flow control valve 320 to move to the first position so that the gas-chargeable accumulator 330 is placed in to fluid communication with the fluid interface 110. In the embodiment of FIG. 2, the flow control valve 320 is a shuttle valve. In some embodiments, the flow control valve 320 may be configured to be positionable in one or more other positions, such as one or more intermediate positions between the first and second positions.

The hydraulic landing gear extension and retraction system 400 of this embodiment comprises a control valve 406 for controlling which of two paths from the reservoir of the hydraulic landing gear extension and retraction system 400 is in fluid communication with the hydraulic fluid supply line 202. In the example shown in FIG. 2, the control valve 406 is a shuttle valve, which is biased to a position (as shown in FIG. 2) in which hydraulic fluid is permitted to flow from the landing gear bogie pitch trimmer 300 to the reservoir 210 of the hydraulic landing gear extension and retraction system 400. The system 2 is configured such that, when the control valve 406 is in a different position (not shown), hydraulic fluid can flow from the reservoir 210 to the hydraulic fluid supply line 202 and the fluid interface 110 to an input 321 of the flow control valve 320 (as shown in FIG. 2 by dashed line 111). As noted above, the flow control valve 320 is configured so that hydraulic fluid pressure at the input 321 of the flow control valve 320 causes the flow control valve 320 to move to the first position to permit the hydraulic fluid to flow to the gas-chargeable accumulator 330.

The hydraulic landing gear extension and retraction system 400 may comprise a hydraulic fuse 208 to protect the system 2 in the event of a pipe rupture. The purpose and operation of the hydraulic fuse 208 is as described above in relation to the hydraulic fuse shown in FIG. 1.

In this embodiment, the system 2 comprises a landing gear controller 220. In the embodiment shown in FIG. 2, the hydraulic landing gear extension and retraction system 400 comprises the landing gear controller 220. In other embodiments, the landing gear controller 220 may be external to the hydraulic landing gear extension and retraction system 400.

The landing gear controller 220 is, ultimately, to control the flow control valve 320 of the landing gear bogie pitch trimmer 300 to control a volume of hydraulic fluid in the gas-chargeable accumulator 330. The landing gear controller 320 is configured to determine, based on at least one predetermined criterion, whether a flow of hydraulic fluid through the fluid interface 110 is to be permitted by the flow control valve 320, and when it is determined that the flow of hydraulic fluid through the fluid interface 110 is to be permitted, cause the flow control valve 320 to open to permit flow of hydraulic fluid through the fluid interface 110. In this embodiment, "open" is to be defined as a position of the flow control valve 320 in which hydraulic fluid can flow from the fluid interface 110 to the gas-chargeable accumulator 330.

The controller 220 of this embodiment is configured to receive a signal indicative of a characteristic of the landing gear bogie pitch trimmer 300. In this embodiment, the signal is received by the controller 220 from the terminal 308 via communications line 424. In other embodiments, in which controller 220 and the monitor 422 are separate entities, the controller 220 may receive the signal from the monitor 422. The signal received by the controller 220 from the monitor 422 is based on the signal that the monitor 422 receives from the terminal 308.

The controller 220 of this embodiment is configured to determine, based on the received signal, whether a characteristic of the landing gear bogie pitch trimmer 300 meets a predetermined criterion. For example, the controller 220 may be configured to determine a pressure of the gas-chargeable accumulator 330 based on the received signal, and to determine whether the pressure has fallen below a threshold value.

The landing gear controller 220 may be configured to determine, based on the received signal and a compensation for a determined temperature and/or pressure in the accumulator 330, whether the at least one predetermined criterion has been met. The landing gear controller 220 may further be configured to cause the flow control valve 320 to open, when it is determined that the at least one predetermined criterion has been met.

The landing gear controller 220 may be configured to receive a signal indicating that the hydraulic landing gear extension and retraction system 400 is to extend or retract the landing gear upon which the landing gear bogie pitch trimmer 300 acts. In some embodiments, the landing gear controller 220 may be configured to cause the hydraulic landing gear extension and retraction system 400 to energise to extend or retract the landing gear, on the basis of that signal.

In some embodiments, the landing gear controller 220 is configured to cause the flow control valve 320 to open (by suitable positioning of the control valve 406) upon determining that the flow of hydraulic fluid through the fluid interface 110 is to be permitted and, in addition, upon receiving a signal that the hydraulic landing gear extension and retraction system 400 is to extend or retract the landing gear.

The landing gear controller 220 may be configured to cause the flow control valve 320 to open immediately before and/or after extension and/or retraction of a landing gear upon which the landing gear bogie pitch trimmer 300 acts. In this way, when the hydraulic landing gear extension and retraction system 400 is energised for extending or retracting the landing gear, the flow control valve 320 is caused to open by the landing gear controller 220 to permit flow of hydraulic fluid through the fluid interface 110 to the gas-chargeable accumulator 330. The hydraulic landing gear extension and retraction system 400 is therefore energised for a slightly longer period of time than for only extending or retracting the landing gear. In embodiments where the flow control valve 320 is opened before extension or retraction of the landing gear, the landing gear controller 220 may be configured to cause the flow control valve 320 to close (by suitable positioning of the control valve 406 to cause a reduction in fluid pressure acting on the flow control valve 320) before extension or retraction of the landing gear is commenced.

The landing gear controller 220 may be configured to determine an amount of hydraulic fluid to be delivered to the landing gear bogie pitch trimmer 300 and to cause closure of the flow control valve 320 when the determined amount of hydraulic fluid has been delivered to the landing gear bogie pitch trimmer 300.

The landing gear controller 220 may be configured to cause closure of the flow control valve 320 in dependence on a real-time indication from the monitor 422 of a characteristic of the gas-chargeable accumulator 330. For example, the landing gear controller 220 may be configured to cause the flow control valve 320 to close when the landing gear controller 220 determines that a pressure in the gas-chargeable accumulator 330 has reached a predetermined threshold.

The landing gear controller 220 may be configured to cause closure of the flow control valve 320 after a predetermined interval of time. The predetermined interval of time may be dependent on the hydraulic pressure of the hydraulic landing gear extension and retraction system 400. The predetermined interval of time may be dependent on a flow rate of hydraulic fluid through the fluid interface 110, for example so that the predetermined interval of time equates to an amount of time required to deliver a known volume of hydraulic fluid from the hydraulic landing gear extension and retraction system 400 to the fluid interface 110.

In some embodiments, such as that shown in FIG. 2, the landing gear bogie pitch trimmer 300 comprises a terminal 308 connected to the gas-chargeable accumulator 330 and for connection to a monitor 422 for monitoring a characteristic of the gas-chargeable accumulator 330. In some embodiments, the landing gear bogie pitch trimmer 300 comprises one or more sensors (not shown) configured to sense a characteristic of the landing gear bogie pitch trimmer 300. The one or more sensors may sense a characteristic of the gas-chargeable accumulator 330. For example, the one or more sensors may comprise a linear variable differential transformer (LVDT) or a similar position sensor, for sensing a status of the gas-chargeable accumulator 330. The sensed position may be indicative of, for example, a pressure of the gas-chargeable accumulator 330 or a mass of gas in the gas-chargeable accumulator 330. In use, the terminal 308 provides a communications connection between the one or more sensors and the monitor 422.

Figure 3:
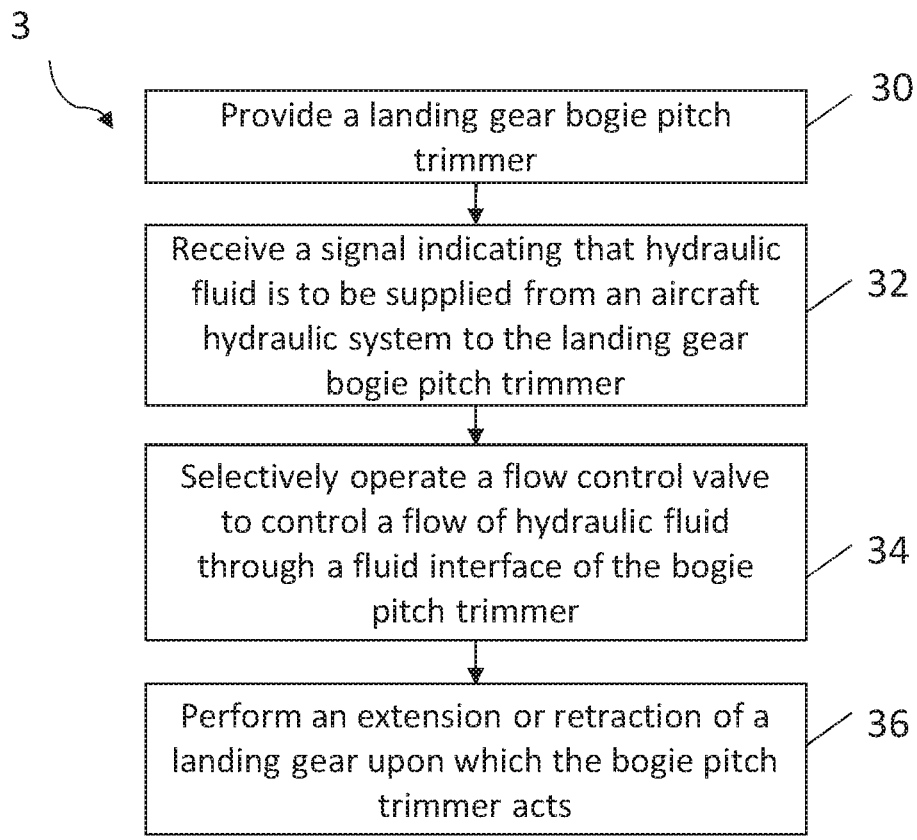
FIG. 3 is a flow diagram showing an example of a method according an embodiment of the invention.

The present invention also provides a method. FIG. 3 is a flow diagram showing an example method 3 according to an embodiment of the invention. The method 3 of this embodiment comprises providing 30 a landing gear bogie pitch trimmer, comprising: a hydraulic actuator for adjusting a pitch of a landing gear bogie, in use; a fluid interface for receiving, from an aircraft hydraulic system external to the landing gear bogie pitch trimmer, hydraulic fluid for use in actuating the hydraulic actuator; and a flow control valve for controlling flow of the hydraulic fluid through the fluid interface in use. The method further comprises selectively operating 34 the flow control valve to control the flow of the hydraulic fluid through the fluid interface. That is, the flow of hydraulic fluid through the fluid interface is not continuous, and is supplied from a hydraulic system that is external to the landing gear bogie pitch trimmer.

The landing gear bogie pitch trimmer referred to in the method may be one of the landing gear bogie pitch trimmers 100, 300 described above, such as one of those illustrated in FIGS. 1 and 2. Similarly, the aircraft hydraulic system referred to in the method may be one of the hydraulic landing gear extension and retraction systems 200, 400 described above, such as one of those illustrated in FIGS. 1 and 2. Selectively operating 34 the flow control valve may be by a controller, such as one of the landing gear controllers 220 described above, such as one of those illustrated in FIGS. 1 and 2.

In this embodiment, the method 3 also comprises receiving 32 a signal indicating that hydraulic fluid is to be supplied from the aircraft hydraulic system to the landing gear bogie pitch trimmer, and selectively operating 34 the flow control valve in dependence on the signal. The signal may be indicative of a characteristic of a gas-chargeable accumulator of the landing gear bogie pitch trimmer. For example, the signal may be indicative that a pressure of the gas-chargeable accumulator has fallen below a predetermined threshold.

The signal may be indicative that the landing gear upon with the landing gear bogie pitch trimmer acts is to extend or retract.

The method 3 of this embodiment also comprises performing 36 an extension or retraction of the landing gear. The selectively operating 34 the flow control valve may be in dependence on performing 36 the extension or retraction of the landing gear. The performing an extension or retraction 36 of the landing gear may be by the aircraft hydraulic system.

In some embodiments, the selectively operating 34 the flow control valve is simultaneous with performing an extension or retraction 36 of the landing gear. That is, the method may comprise selectively operating 34 the flow control valve to permit hydraulic fluid to flow from the aircraft hydraulic system to a hydraulic actuator of the landing gear bogie pitch trimmer at the same time as performing an extension or retraction 36 of the landing gear, so that the landing gear bogie is positioned at a predetermined pitch during extension or retraction 36 of the landing gear.

In some embodiments, the selectively operating 34 the flow control valve may be performed immediately before or after performing an extension or retraction 36 of the landing gear to help to limit an additional duty cycle on an intermittent hydraulic landing gear extension and retraction system.

Figure 4:
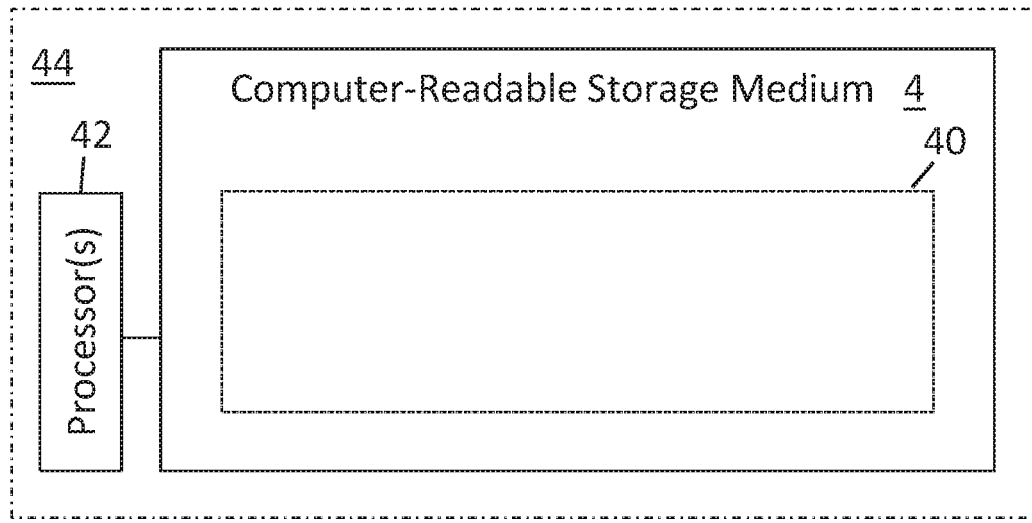
FIG. 4 shows a schematic diagram of an example of a non-transitory computer-readable storage medium according an embodiment of the invention.

FIG. 4 shows a schematic diagram of a non-transitory computer-readable storage medium 4 according to an embodiment of the invention. The non-transitory computer-readable storage medium 4 stores instructions 40 that, if executed by a processor 42 of a controller 44, cause the processor 42 to perform a method according to an embodiment of the present invention. In some embodiments, the controller 44 is one of the landing gear controllers 220 described above, such as one of those described with reference to FIG. 1 or FIG. 2. The instructions 40 comprise providing a landing gear bogie pitch trimmer of an embodiment of the invention, and selectively operating a flow control valve of the landing gear bogie pitch trimmer to control a flow of the hydraulic fluid through a fluid interface of the landing gear bogie pitch trimmer from an aircraft hydraulic system external to the landing gear bogie pitch trimmer. The instructions 40 may comprise performing the method 3 described above with reference to FIG. 3.

Figure 5:
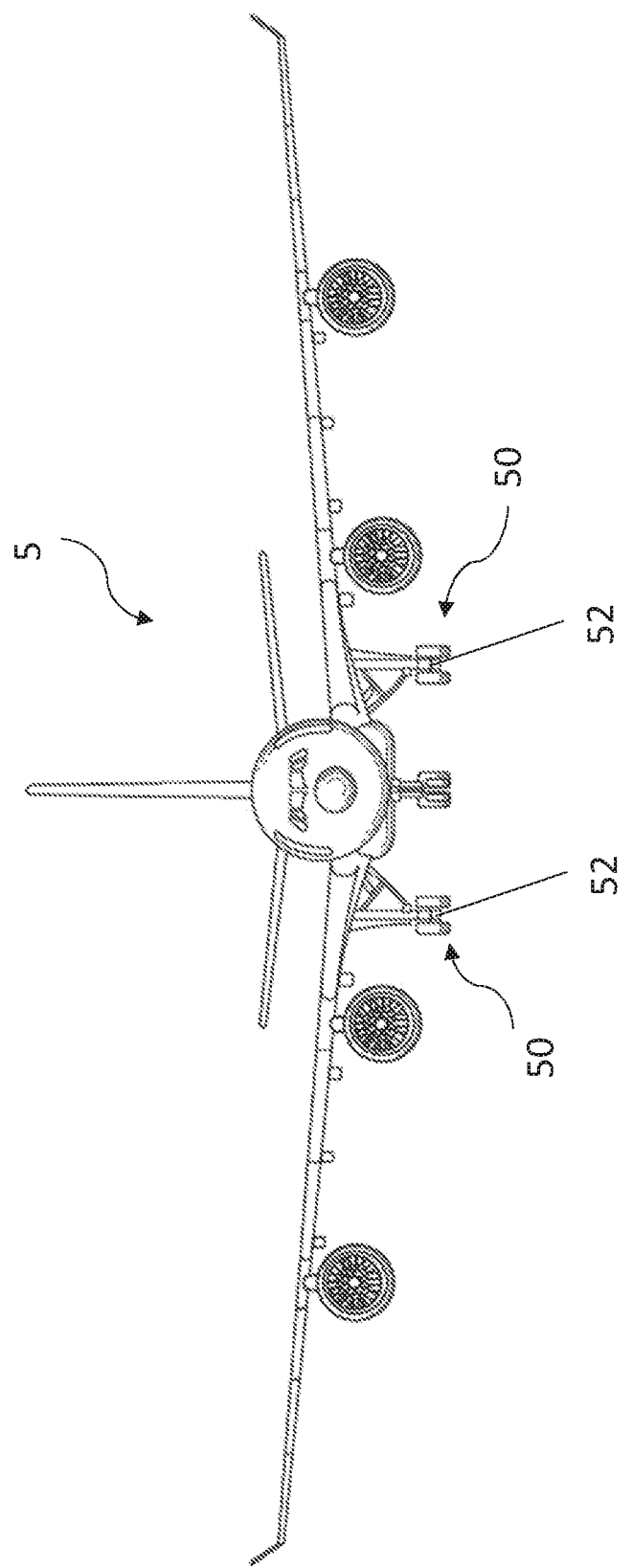
FIG. 5 shows a schematic side view of an example of an aircraft according to an embodiment of the invention.

FIG. 5 shows a schematic diagram of an aircraft 5 in accordance with an embodiment of the present invention. In this embodiment, the aircraft 5 comprises two main landing gears 50 each comprising a plurality of wheels mounted on a landing gear bogie 52. Each main landing gear 50 comprises one of the systems 1, 2 discussed above with reference to FIGS. 1 and 2, respectively. The aircraft 5 also comprises the non-transitory computer-readable storage medium 4 discussed above with reference to FIG. 4. In some embodiments, the aircraft 5 comprises a system 1, 2 for each main landing gear 50. In other embodiments, the system 1, 2 is common to the two main landing gears 50. In some embodiments, the hydraulic landing gear extension and retraction system 200, 400 is local to a specific landing gear 50. In other embodiments, the hydraulic landing gear extension and retraction system 200, 400 supplies hydraulic power to both main landing gears 50 and is a common hydraulic landing gear extension and retraction system 200, 400.

The above embodiments are to be understood as non-limiting illustrative examples of how the present invention, and aspects of the present invention, may be implemented. Further examples of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It is to be noted that the term "or" as used herein is to be interpreted to mean "and/or", unless expressly stated otherwise.

The invention claimed is:

1. A landing gear bogie pitch trimmer, comprising:
 a hydraulic actuator for adjusting a pitch of a landing gear bogie, in use;
 a fluid interface for receiving, from an aircraft hydraulic system external to the landing gear bogie pitch trimmer, hydraulic fluid for use in actuating the hydraulic actuator;
 a flow control valve for controlling flow of the hydraulic fluid through the fluid interface in use;
 a gas-chargeable accumulator configured to be charged by a gas bottle;
 wherein the gas-chargeable accumulator is in fluid communication with the flow control valve; and
 wherein the gas-chargeable accumulator is configured to deliver the hydraulic fluid to the hydraulic actuator in use.

2. The landing gear bogie pitch trimmer according to claim 1, comprising a terminal that is connected to the gas-chargeable accumulator, wherein the terminal is for connection to a monitor for monitoring a characteristic of the gas-chargeable accumulator.

3. The landing gear bogie pitch trimmer according to claim 1, comprising a non-return valve for restricting or preventing flow of hydraulic fluid in a direction from the gas-chargeable accumulator towards the fluid interface.

4. The landing gear bogie pitch trimmer according to claim 1, configured so that, in a first position of the flow control valve, a first side of the hydraulic actuator is in fluid communication with the fluid interface via the flow control valve, so that the hydraulic actuator is actuated to move the landing gear bogie by the flow of hydraulic fluid in use.

5. The landing gear bogie pitch trimmer according to claim 4, configured so that, in a second position of the flow control valve, the first side of the hydraulic actuator is in fluid communication with a second side of the hydraulic actuator.

6. The landing gear bogie pitch trimmer according to claim 1, comprising a second fluid interface, wherein the hydraulic actuator is selectively fluidly connectable to the second fluid interface to permit the flow of hydraulic fluid from the hydraulic actuator out of the landing gear bogie pitch trimmer via the second fluid interface.

7. The landing gear bogie pitch trimmer according to claim 6, comprising a second non-return valve for restricting or preventing flow of hydraulic fluid from the second fluid interface towards the hydraulic actuator.

8. The landing gear bogie pitch trimmer according to claim 6, wherein the second fluid interface is the fluid interface.

9. A system, comprising:
a landing gear bogie pitch trimmer; and
a hydraulic landing gear extension and retraction system for extending and retracting a landing gear upon which a landing gear bogie is mounted, the hydraulic landing gear extension and retraction system having a hydraulic fluid supply line;
wherein the landing gear bogie pitch trimmer comprises:
a hydraulic actuator for adjusting a pitch of the landing gear bogie, in use;
a fluid interface for connection to the hydraulic fluid supply line of the hydraulic landing gear extension and retraction system for receiving hydraulic fluid for use in actuating the hydraulic actuator;
a flow control valve for controlling flow of the hydraulic fluid through the fluid interface in use;
a gas-chargeable accumulator configured to be charged by a gas bottle;
wherein the gas-chargeable accumulator is in fluid communication with the flow control valve; and
wherein the gas-chargeable accumulator is configured to deliver the hydraulic fluid to the hydraulic actuator in use.

10. The system according to claim 9, wherein the hydraulic fluid supply line of the hydraulic landing gear extension and retraction system is fluidly connected to the fluid interface of the landing gear bogie pitch trimmer.

11. The system according to claim 10, configured so that operation of the hydraulic landing gear extension and retraction system causes operation of the flow control valve of the landing gear bogie pitch trimmer in use.

12. A landing gear controller to control a flow control valve of a landing gear bogie pitch trimmer, the flow control valve for controlling flow of a hydraulic fluid through a fluid interface of the landing gear bogie pitch trimmer from an aircraft hydraulic system external to the landing gear bogie pitch trimmer, wherein the landing gear controller is configured to:
determine, based on at least one predetermined criterion based on the characteristics a gas-chargeable accumulator configured to be charged by a gas bottle, to whether a flow of hydraulic fluid through the fluid interface is to be permitted by the flow control valve; and
when it is determined that the flow of hydraulic fluid through the fluid interface is to be permitted, cause the flow control valve to be in an open position to permit flow of hydraulic fluid through the fluid interface.

13. The landing gear controller according to claim 12, configured to receive a signal indicative of a characteristic of the gas-chargeable accumulator of the landing gear bogie pitch trimmer.

14. The landing gear controller according to claim 12, configured to cause the flow control valve to open immediately before and/or after extension and/or retraction of a landing gear upon which the landing gear bogie pitch trimmer acts.

15. The landing gear controller according to claim 12, configured to cause the flow control valve to open during extension and/or retraction of a landing gear upon which the landing gear bogie pitch trimmer acts.

* * * * *